(12) United States Patent
Gregory et al.

(10) Patent No.: US 12,031,284 B2
(45) Date of Patent: Jul. 9, 2024

(54) DEVICES, SYSTEMS, AND METHODS FOR REMOVING WASTE FROM BODIES OF WATER

(71) Applicant: Clean Waterways, LLC, Fort Lauderdale, FL (US)

(72) Inventors: Charles Gregory, Fort Lauderdale, FL (US); Miles A. Forman, II, Fort Lauderdale, FL (US); John T. Loos, III, Fort Lauderdale, FL (US); Shane Lafreniere, Fort Lauderdale, FL (US); John Milledge, Fort Lauderdale, FL (US); Michael Lambrechts, Fort Lauderdale, FL (US)

(73) Assignee: Clean Waterways, LLC, Fort Lauderdale, FL (US)

( * ) Notice: Subject to any disclaimer, the term of this patent is extended or adjusted under 35 U.S.C. 154(b) by 0 days.

(21) Appl. No.: 17/694,525

(22) Filed: Mar. 14, 2022

(65) Prior Publication Data

US 2022/0290393 A1 Sep. 15, 2022

Related U.S. Application Data

(60) Provisional application No. 63/195,651, filed on Jun. 1, 2021, provisional application No. 63/161,413, filed on Mar. 15, 2021.

(51) Int. Cl.
*E02B 15/04* (2006.01)
*C02F 1/24* (2023.01)
*C02F 103/00* (2006.01)

(52) U.S. Cl.
CPC .............. *E02B 15/045* (2013.01); *C02F 1/24* (2013.01); *E02B 15/046* (2013.01); *C02F 2103/007* (2013.01)

(58) Field of Classification Search
CPC ...... E02B 15/045; E02B 15/046; E02B 15/10; E02B 1/003; C02F 1/24; C02F 2103/007; C02F 2209/008
(Continued)

(56) References Cited

U.S. PATENT DOCUMENTS 2,493,166 A * 1/1950 Schmitz, Jr. ........... B01D 19/02
210/538
3,844,944 A * 10/1974 Mercuri ............ B01D 17/0211
210/776
(Continued)

FOREIGN PATENT DOCUMENTS

WO 1996038223 A1 12/1996
WO WO-2005123598 A1 * 12/2005 ................ C02F 1/24
(Continued)

OTHER PUBLICATIONS

Each_definition_NPL.pdf (Year: 2023).*
(Continued)

*Primary Examiner* — Ekandra S. Miller-Cruz
(74) *Attorney, Agent, or Firm* — Koenig IP Works, PLLC; Katherine Koenig

(57) ABSTRACT

The present disclosure relates to devices, systems, and methods for using foam fractionation to remove non-polar waste molecules, including, but not limited to, sewage bacteria, environmental contaminants, and/or sediment/turbidity caused by dredging activities, from open-water aquatic environments. Some foam fractionation systems disclosed herein generally include a plurality of floating foam fractionation devices, each floating foam fractionation device including a floating body, a submerged hood coupled to the body, and at least one submerged air conduits for releasing bubbles into the surrounding water. Other foam fractionation systems disclosed herein generally include a submerged bubble generation device and a floating intake
(Continued)

unit positioned remotely from the submerged bubble generation device.

6 Claims, 9 Drawing Sheets

(58) Field of Classification Search
USPC .......................................................... 210/800
See application file for complete search history.

(56) References Cited

U.S. PATENT DOCUMENTS

| | | | | |
|---|---|---|---|---|
| 4,022,690 A | * | 5/1977 | Smith | E04H 4/1272 |
| | | | | 210/249 |
| 4,609,466 A | * | 9/1986 | McCausland | B01D 61/04 |
| | | | | 210/257.2 |
| 4,746,424 A | * | 5/1988 | Drew | E04H 4/1263 |
| | | | | 210/167.2 |
| 5,006,239 A | | 4/1991 | Mishra | |
| 5,326,475 A | * | 7/1994 | Kent | C02F 3/101 |
| | | | | 210/615 |
| 5,910,254 A | | 6/1999 | Guelcher et al. | |
| 6,132,604 A | * | 10/2000 | Kirchoff | E04H 4/1609 |
| | | | | 210/470 |
| 6,274,047 B1 | * | 8/2001 | Bates | E02B 15/106 |
| | | | | 210/776 |
| 8,485,132 B2 | | 7/2013 | Kong | |
| 2007/0245971 A1 | | 10/2007 | Rayner | |
| 2009/0127176 A1 | | 5/2009 | Cummins | |
| 2010/0050502 A1 | | 3/2010 | Wu et al. | |
| 2017/0066896 A1 | * | 3/2017 | Behrens | B03D 1/012 |

FOREIGN PATENT DOCUMENTS

| | | |
|---|---|---|
| WO | 2020097694 A1 | 5/2020 |
| WO | 2020153846 A1 | 7/2020 |

OTHER PUBLICATIONS

Ex-Situ Treatment: Surface Active Foam Fractionation (SAFF®), Opec Systems (available online at: https://ppecsystems.com/enviro/pfas-solutions/ex-situ-treatment-surface-active-foam-fractionation-saff/).

Phillips, Steve, OPEC brings PFAS Foam Fractionation Above ground!, LinkedIn (Dec. 2017) (available online at: https://www.linkedin.com/pulse/opec-brings-pfas-foam-fractionation-above-ground-steve-phillips).

* cited by examiner

DEVICES, SYSTEMS, AND METHODS FOR REMOVING WASTE FROM BODIES OF WATER

CROSS-REFERENCE TO RELATED APPLICATIONS

This Application is related to and claims the benefit of U.S. Provisional Patent Application No. 63/161,413, filed Mar. 15, 2021, entitled DEVICES, SYSTEMS, AND METHODS FOR REMOVING WASTE FROM BODIES OF WATER, and this Application is related to and claims the benefit of U.S. Provisional Patent Application No. 63/195,651, filed Jun. 1, 2021, entitled MODULAR AND SCALABLE SYSTEM FOR REMOVING WASTE FROM BODIES OF WATER, the entirety of each of which is incorporated by reference herein in its entirety.

GOVERNMENT RIGHTS STATEMENT

N/A.

FIELD

The present disclosure relates to devices, systems, and methods using foam fractionation to remove non-polar waste molecules, including, but not limited to, sewage bacteria, environmental contaminants such as nitrogen and phosphorus, petroleum products, pharmaceutical chemicals, and/or sediment/turbidity caused by dredging activities, from open-water aquatic environments. The present disclosure also relates to such devices, systems, and methods that are modular and easily scalable to increase effective treatment area.

BACKGROUND

Foam fractionation is a process by which non-polar waste molecules, such as sewage bacteria, waste and/or runoff chemicals, petroleum products, and other organic compounds, are removed from water. Foam fractionators (also called protein skimmers or protein fractionators) are used in commercial applications, including municipal water treatment facilities, public aquariums, as well as home aquariums and in-home filtration. For example, although originally used for recuperating valuable biomedical compounds, the use of foam fractionation has become popular in the aquarium industry for polishing water to the high qualities necessary for raising fragile fish and invertebrates such as coral. In this capacity, the technology removes leftover food and animal waste from a closed system.

However, environmental trials using industrial-sized foam fractionators designed for large public aquariums, for example, not only require significant customization to integrate these machines into platforms that are environmentally durable, versatile, and deployable, but their design must also be carefully considered so these machines draw and release water safely from and to the surrounding environment. Additionally, although foam fractionators that are capable of maximizing foam fractionation for water purification are currently designed for land-based and closed-system applications, are not configured for mobile applications, such as for temporary and/or repositionable use along canals, in ports, marinas, and/or harbors, in small inland ponds and lakes, and/or narrow and/or shallow waterways, and other locations, including for non-permanent use. Further, known foam fractionation systems are not sufficiently scalable or efficient for large-scale use and/or use in public waterways.

SUMMARY

Some embodiments advantageously provide devices, systems, and methods for removing waste materials from a body of water. In one embodiment, a system for removing waste materials from a body of water includes: at least one foam fractionation device; and an intake unit in fluid communication with the at least one foam fractionation device, the intake unit being configured to intake water from the body of water and to be located a distance from the at least one foam fractionation device when the system is in use.

In aspect of the embodiment, the system further includes a base vessel, the at least one foam fractionation device being located on the base vessel. In one aspect of the embodiment, the base vessel is at least one of a floating barge, a boat, a stationary platform, and a land-based trailer.

In one aspect of the embodiment, the intake unit is configured to intake water but to exclude items larger than approximately 0.25 inch in diameter.

In one aspect of the embodiment, the intake unit includes an adjustable intake nozzle.

In one aspect of the embodiment, the intake unit is configured to float in the body of water.

In one aspect of the embodiment, the system further includes at least one waste containment unit, the at least one waste containment unit being in communication with the at least one foam fractionation device by a waste conduit. In one aspect of the embodiment, at least a portion of the at least one waste containment unit is configured to float in the body of water.

In one aspect of the embodiment, the system further includes at least one floating foam fractionation device, the at least one floating foam fractionation device being in fluid communication with and positionable a distance from the at least one foam fractionation device. In one aspect of the embodiment, the system further includes: a base vessel; and a power supply on the base vessel, the power supply providing power to the at least one foam fractionation device.

In one aspect of the embodiment, the system further includes a floating intake unit, the floating intake unit including: a flotation portion; a submersible portion attached to the flotation portion, the submersible portion being configured to be submerged with the floating intake unit is in use; an intake nozzle within the submersible portion, the intake nozzle being positioned within the submersible portion such that the intake nozzle is below a surface of water and is configured to draw a film of waste floating on the surface of the water into the intake nozzle when the floating intake unit is in use; and an intake conduit, the intake conduit being configured to be connected between the intake nozzle and at least one foam fractionation device. In one aspect of the embodiment, the submersible portion includes a plurality of apertures sized such that items larger than approximately 0.25 inch in diameter are excluded from entering the submersible portion.

In one embodiment, a method for removing waste materials from a body of water includes: positioning a base vessel within the body of water, the base vessel supporting at least one foam fractionation device; and intaking water from the body of water into the at least one foam fractionation device through an intake unit, the at least one foam fractionation device removing waste materials from the water, at least a portion of the intake unit floating on a surface of the body of water. In one aspect of the embodiment, the method further includes discharging the waste materials from the at least one foam fractionation device into a waste containment unit, at least a portion of the waste containment floating on the surface of the body of water. In one aspect of the embodiment, the method further includes: submerging a bubble generation device within the body of water; positioning the intake unit at a location remote from the bubble generation device, the intake unit including an intake nozzle; generating a stream of bubbles from the bubble generation device; and operating the intake unit to draw the bubbles into the intake nozzle.

In one embodiment, a system for removing waste materials from a body of water includes at least one floating foam fractionation device, each of the at least one floating foam fractionation device including: a body, the body having an upper portion and a lower portion; a hood extending downward from the lower portion of the body; and a bubble generation system.

In one aspect of the embodiment, the bubble generation system has: an air intake element; an air conduit assembly extending downward from the lower portion of the body and through the hood; and an air pump in fluid communication with the air intake element and the air conduit assembly.

In one aspect of the embodiment, the air conduit assembly includes a plurality of outlet apertures.

In one aspect of the embodiment, the body defines: an inlet aperture, the inlet aperture extending through the body from the upper portion to the lower portion and being in fluid communication with the hood; and a foam collection basin at least partially surrounding the inlet aperture.

In one aspect of the embodiment, the body of each of the at least one floating foam fractionation device includes a coupling mechanism, the coupling mechanism of one of the at least one floating foam fractionation device being engageable with the coupling mechanism of another of the at least one floating foam fractionation device.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
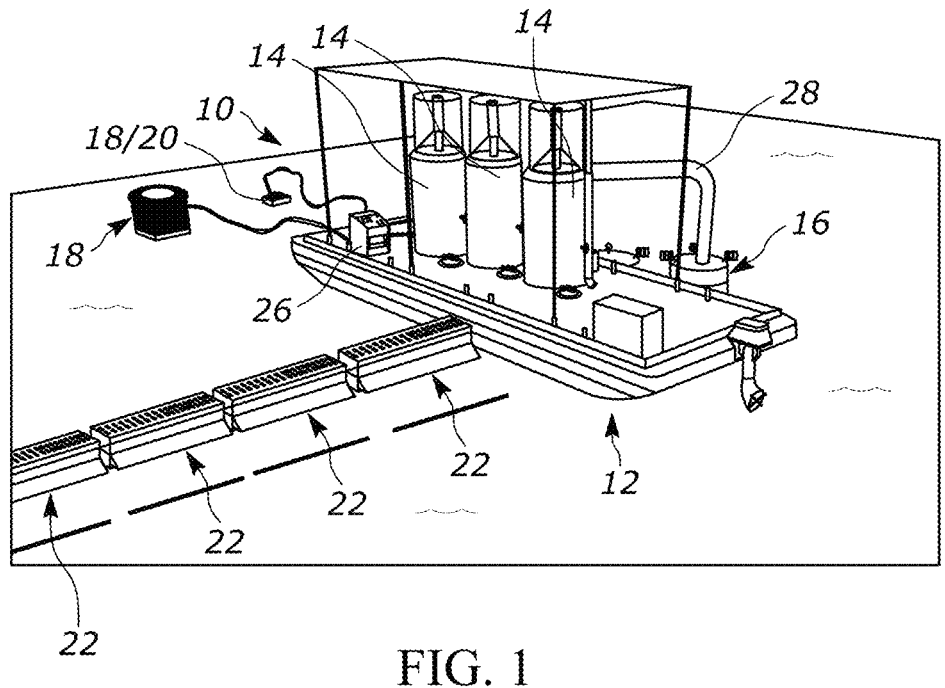
FIGS. 1-4 show perspective views of an exemplary embodiment of a foam fractionation system, in accordance with the present disclosure.

Before describing in detail exemplary embodiments, it is noted that the embodiments reside primarily in combinations of apparatus components and steps related to foam fractionation and foam fractionation devices. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The systems and methods disclosed herein involve the aggregation, concentration, and evacuation of non-polar waste molecules from open-water systems including bacteria, environmental contaminants such as nitrogen and phosphorus, and/or sediment/turbidity caused by dredging activities, and, in some cases, petroleum products or pharmaceutical and industrial chemicals from spills and/or unintended release into the environment. In some embodiments, the systems and methods disclosed herein involve the aggregation, concentration, and evacuation of materials such as bacteria, most human-generated waste, and naturally occurring waste and byproduct molecules from a surrounding aquatic environment using foam fractionation. Human-generated waste molecules include many therapeutic and antibiotic products as well as products such as pesticides and industrial waste, which can accumulate in the environment and detrimentally affect ecology. Naturally occurring molecules that can be toxic to the environment include cellular debris or toxins produced during bacterial and algal blooms that are most often caused by human activities.

In its simplest form, the system for removing waste from bodies of water disclosed herein (for example, a foam fractionation system) includes a vessel, vehicle, or structure for supporting and deploying one or more foam fractionation devices in a body of water. In some embodiments, the foam fractionation system disclosed herein includes specialized water intake and/or outflow components for prefiltering intake water, preventing injury or damage to aquatic life, improving the collection of surface films, more efficiently collecting bottom debris, and providing other benefits. In some embodiments, the foam fractionation system disclosed herein includes one or more adjunct components, such as floating foam fractionation devices. In some embodiments, the foam fractionation system disclosed herein includes at least one bubble generation system and at least one intake unit. The foam fractionation system disclosed herein is modular, efficiently and easily scalable, and adaptable to suit any of a variety of environment conditions, uses, and treatment area types and sizes.

Referring now to FIGS. 1-4, perspective views of an exemplary embodiment of a system 10 for removing waste from a body of water are shown. In the exemplary embodiment shown in FIGS. 1-4, the system 10 is a foam fractionation system that is configured such that at least a portion of the foam fractionation system 10 rests upon and/or is borne or supported by a boat, barge, or other vehicle or vessel 12 floating within the body of water to be treated, including without limitation open waterways such as canals, rivers inlets, lakes, ponds, and the like. In some embodiments, the foam fractionation system 10 generally includes a base vessel 12, at least one foam fractionation device 14, at least one waste containment unit 16, and at least one intake unit 18. In one embodiment, the foam fractionation system 10 further includes an outflow unit 20, which may be separate from or integrated with an intake unit 18. In one embodiment, the foam fractionation system 10 optionally includes at least one floating foam fractionation device 22. The floating foam fractionation device 22 may also be referred to herein as a "surface skimmer." The foam fractionation system 10 is scalable in that any number of base vessels or vehicles 12, foam fractionation devices 14, intake units 18, waste containment units 16, outflow units 20, and/or floating foam fractionation device 22 may be used, depending on factors such as the size, type, and/or conditions of the area to be treated. It will also be understood that, in some embodiments, the foam fractionation system 10 is configured for use adjacent to or nearby a body of water, such as a canal, reservoir, channel, irrigation system, or the like. For example, the base vessel 12 may be (or be towable behind or pushed in front of) a mobile base vessel, such as a boat, skiff, barge, raft, or a land vehicle such as a truck, tractor, trailer, terrestrial barge or platform having wheels, or the like. Thus, the foam fractionation system may travel or be moved along the land adjacent to the body of water, the foam fractionation system treating the water as it moves.

In one embodiment, the base vessel 12 is configured to float on a surface of the water, such that at least a portion extends above the waterline. The base vessel 12 may be a mobile small vessel such as a skiff, raft, floating dock or small barge, or similar structure or vessel, or the base vessel 12 may be a mobile larger vessel such as a ship, boat, barge, or similar structure or vessel. Alternatively, the base vessel 12 may be or include a mobile land vehicle, such as a tractor, truck, trailer, utility vehicle, or the like. Alternatively, the base vessel 12 may be a non-mobile fixed or mounted structure such as a bridge, pier, rig, or the like. In general, the base vessel 12 may be any vessel or structure that is sized and configured to support and/or move one or more foam fractionation devices 14 in, along, or adjacent to a body of water. In some embodiments, the system 10 includes more than one base vessel 12 of the same or different sizes, types, and/or configurations. For example, for treatment of a large area, the system 10 may include two or more systems (such as foam fractionation systems) and/or additional components than those shown in FIGS. 1-4.

In one embodiment, the base vessel 12 is a mobile base vessel that includes a motor, engine with propeller, or other means for propulsion, which may be used to position the base vessel 12 and/or foam fractionation system 10 at the desired treatment site and/or to move the system 10 along or adjacent to the body of water. For simplicity, regardless of the configuration of the base vessel 12 used, any mobile aquatic and/or terrestrial structures and/or vehicles used to support and move the foam fractionation device(s) are collectively referred to herein as a base vessel 12.

Figure 13:
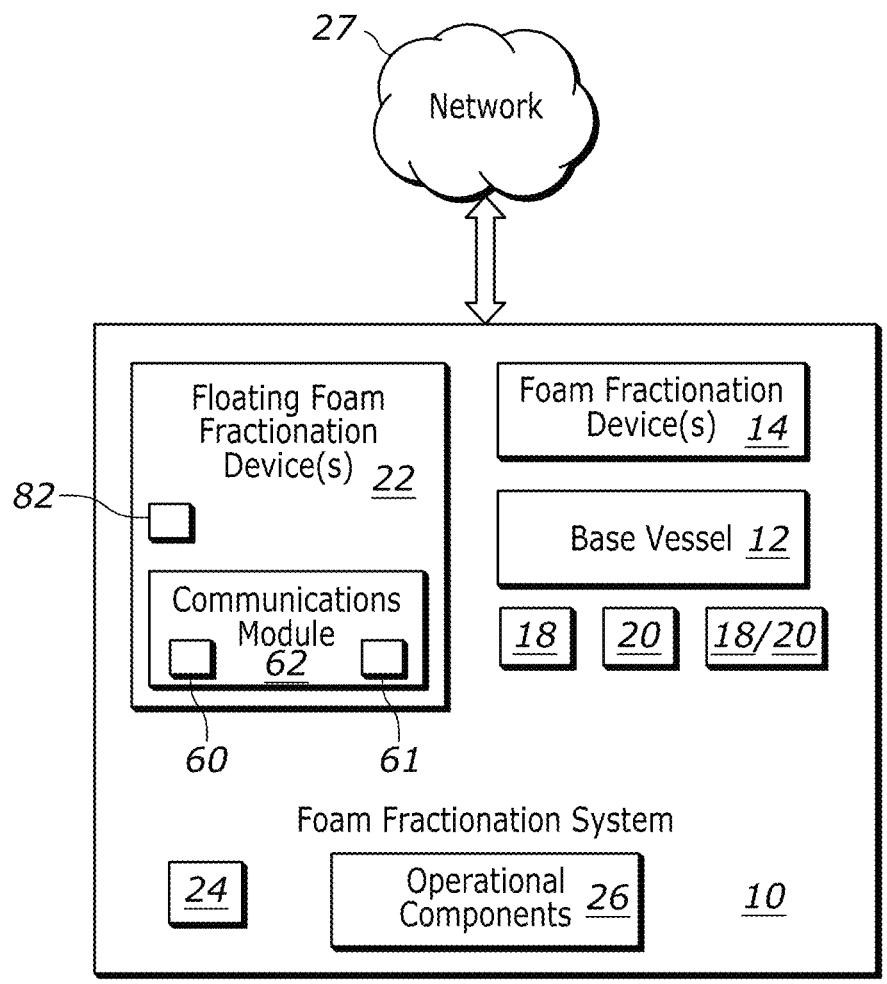
FIG. 13 shows a schematic diagram of a foam fractionation system.

The base vessel 12 may also include or support other foam fractionation system components, such as power sources 24, auxiliary equipment (such as medical or emergency equipment, shade cloths or covers, reservoirs, and/or storage containers or areas), and/or operational components including components for controlling the system 10, and collecting, processing, and/or transmitting data (such as scientific equipment, data storage devices, sensors, communications modules, steering mechanisms, anchoring mechanisms, and others). For example, in some embodiments the base vessel 12 includes or supports operational components 26 including a communications module (for example, one or more transceivers and/or communication modules (Bluetooth®, Zigbee®, near field communication, infrared, etc.) for the transfer and/or receipt of data, instructions, and/or signals from remote devices, such as computers, user interface devices, displays, keyboards, biometric identification devices, equipment controllers, RFID or other identification system components (such as readers, tags, and/or antennas), servers, networks, cameras, user radios or cellular devices, and/or the like. In one embodiment, at least some of the operational components 26 are configured to receive, process, and/or transmit data between the components of the system 10 and/or between the system 10 and a network 27 (for example, as shown in FIG. 13) or other remote data storage system and/or remote computing system. Additionally, in some embodiments the operational components 26 allow a user to remotely operate the foam fractionation system. It will be understood that alternative or additional means for the collection and organization of data (including, for example, skimmate composition, detected waste particles, water chemistry parameters, operating hours, fault conditions, user identification, air flow volume and rate, water pH, water temperature, precipitation, and other information) may be used.

In one embodiment, the at least one foam fractionation device 14 includes a plurality of foam fractionation devices 14. Although three foam fractionation devices 14 are shown in FIGS. 1-4, it will be understood that any number may be used. The size, shape, configuration, and/or capacity of each foam fractionation device 14 may be chosen based on factors such as the size, type, and/or conditions of the area to be treated. In one non-limiting example, each foam fractionation device 14 is a commercial-/industrial-grade device, as is currently known. In some embodiments, each foam fractionation device 14 includes a skimmate collection reservoir at the top. In some embodiments, each foam fractionation device 14 is connected to a power source 24, either directly or indirectly (for example, a plurality of foam fractionation devices 14 may be connected in series to a power source 24). In some embodiments, each foam fractionation device 14 includes waste conduit 28 that is removably connected or removably connectable to a waste containment unit 16. In other embodiments, the foam fractionation devices 14 are connected in series, and the last foam fractionation device of the series is removably connected or removably connectable to a waste containment unit 16 (for example, as shown in FIGS. 1-4). However, it will be understood that the foam fractionation system 10 may include any number of waste containment units 16, and configurations by which the foam fractionation devices 14 are in fluid communication with each other and/or the waste containment unit(s) 16 other than that shown in FIGS. 1-4 may be used.

In one embodiment, each waste containment unit 16 is a floating container having a reservoir 30 sized and configured to safely store waste foam and/or liquid (skimmate or waste from the foam fractionation devices) or other waste and to allow for the rapid and efficient removal of large amounts of foam and/or liquid waste from the waste containment unit 16 for further processing and/or disposal. Additionally, in one embodiment each waste containment unit 16 includes a flotation portion 32 sized and configured to float the waste containment unit 16 at or near the surface of the water. The waste containment unit 16 may sink into the water as its weight increases as the reservoir 30 is filled with foam and/or waste; however, in some embodiments the waste containment unit 16 has enough flotation to ensure that it will not fully sink below the water line when the reservoir 30 is completely full. Additionally, the waste containment unit 16 may include ballast or counterweight to help keep the waste containment unit 16 upright, even in rough waters or strong currents. Additionally, the waste containment unit 16 may include a venting mechanism which, in some embodiments, includes a check valve to vent gas from dissolving foam accumulation.

In some embodiments, the waste containment unit 16 includes a closure device 34, such as a removable or actuatable seal, plug, or cap. When in closure device 34 is in a closed position, the waste containment unit 16 securely holds foam and/or waste without spillage, seepage, or leakage. When the closure device 34 is in an open position, the reservoir 30 is accessible for accepting foam and/or waste for storage and/or for removal of the foam and/or waste. In some embodiments, the closure device 34 is configured to be mateably attached to a waste conduit 28 of a foam fractionation device 14. In some embodiments, the closure device 34 is additionally or alternatively configured to be mateably attached to a vacuum hose of waste disposal infrastructure (for example, of a septic tanker truck, bilge boat, or the like).

The foam fractionation system 10 generally includes a means for the intake of water into at least one foam fractionation device 14 and a means for ejecting or outflowing water from the foam fractionation device(s) 14 and back into the surrounding environment. In some embodiments, the means for the intake of water is an intake unit 18 that is specialized for efficient, safe, and/or prefiltered water into the foam fractionation device 14. For example, in some applications the intake unit 18 is configured to scour the environment's substrates while intaking water, to prefilter the intake water, and to collect large amounts of skimmed waste for processing and disposal. In some embodiments, the intake unit 18 is movable or positionable to be located a distance from the base vessel 12. Additionally, the intake unit 18 is tethered to, but movable relative to, the base vessel 12 and/or foam fractionation device(s) 14, such as by a long, flexible intake conduit 36, such as a hose or tube. In this manner, the intake unit 18 is free to move to different areas of the treatment area and the base vessel 12 may be stationary or undergo limited movement (for example, the base unit may be anchored or attached to a mount such as a dock, larger barge, pier, piling, or the like). However, it will be understood that the base vessel 12 may also be movable and repositionable.

In some embodiments, as shown in FIGS. 1-4 (and as discussed in greater detail with reference to FIG. 9), the intake unit 18 is a floating device that is connected to and in fluid communication with at least one foam fractionation device 14 by an intake conduit 36. In some embodiments, the intake unit 18 is a surface film intake unit 18A (shown in FIG. 9) that includes a flotation portion 38 and a submersible portion 40 attached to the flotation portion 38. In some embodiments, the surface film intake unit 18 includes at least one intake nozzle 42 through which water and skimmed waste flows into the intake conduit 36. The intake nozzle 42 may be positioned at least partially within the submersible portion 40 and positioned close enough to the surface of the water that it draws in a small flow of air to create a vortex that extends downward into the intake nozzle 42. In operation, this helps draw surface films, such as oil or fuel slicks, into the intake nozzle. Thus, such an intake unit may be referred to herein as a surface film intake unit.

Figure 2:
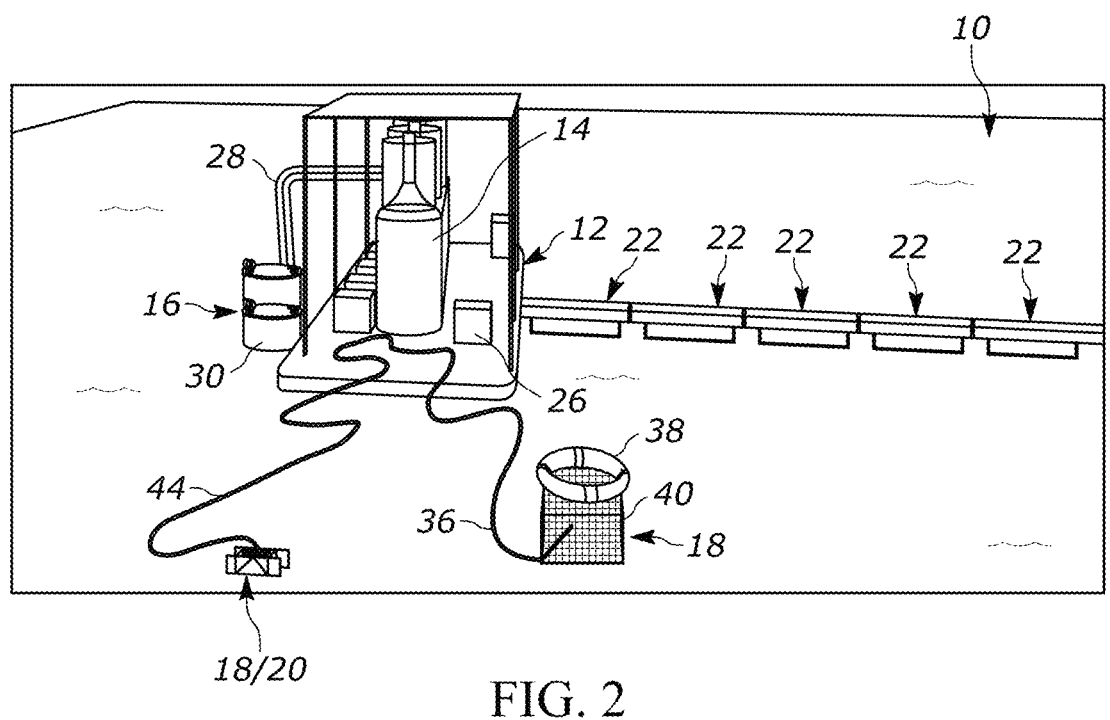
Figure 3:
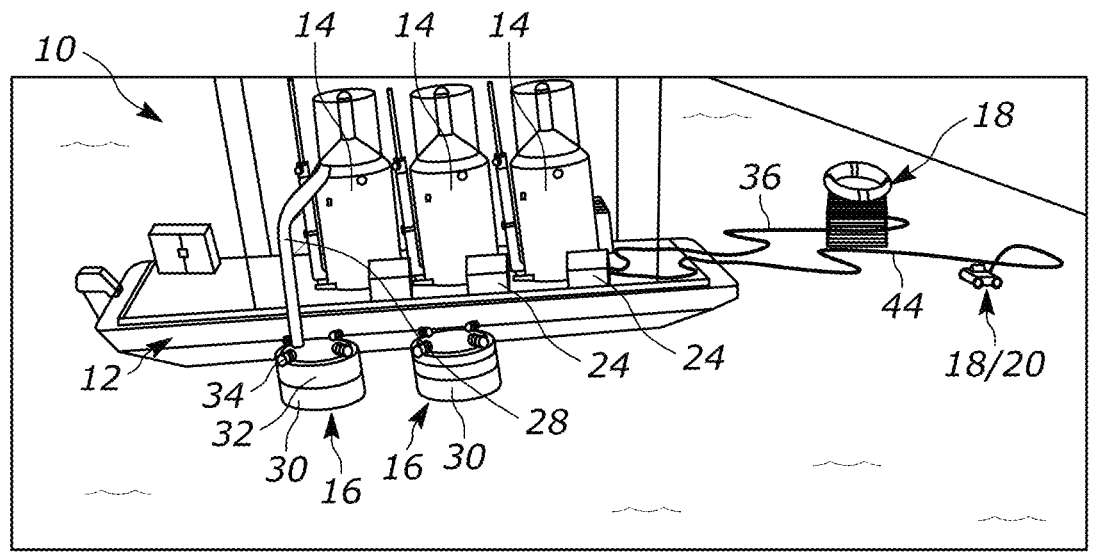
Figure 4:
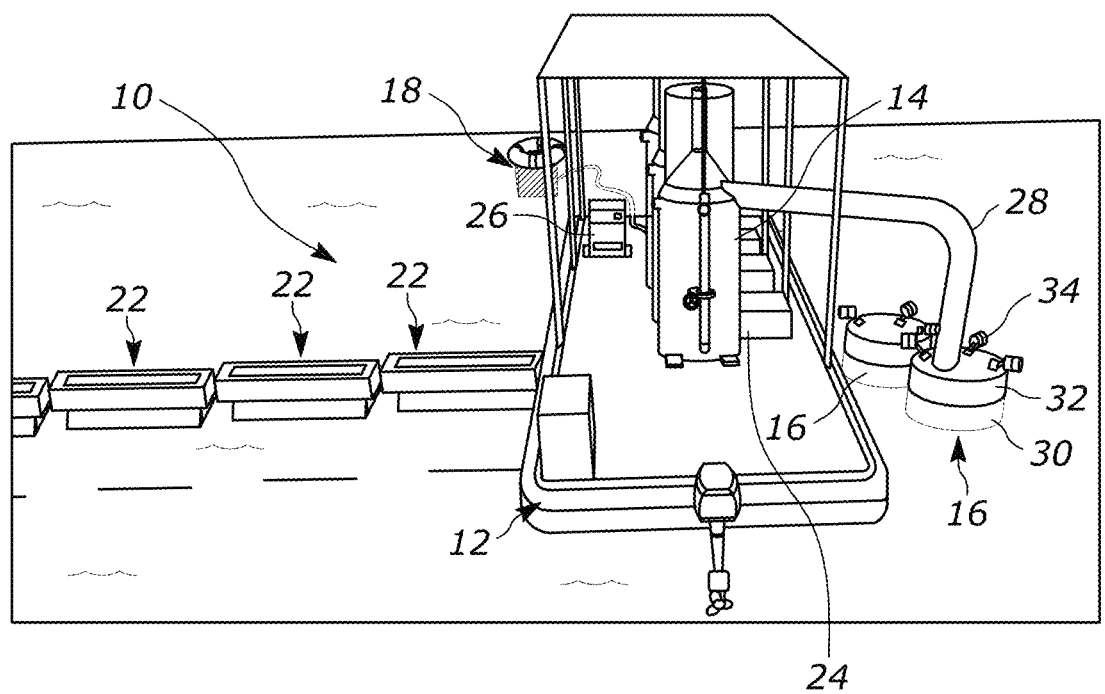

In other embodiments, the intake unit 18 and the outflow unit 20 are integrated into a single submersible intake/outflow unit 18/20. In some embodiments, the intake/outflow unit 18/20 is propelled underwater by the outflow of the foam fractionation device 14 and draws in water and suspended detritus as it travels. In one non-limiting example, the intake/outflow unit 18/20 includes wheels, sled plates, or other components to facilitate travel along the bottom of the substrate of the body of water (for example, sea, lake, or canal floor). In some embodiments, the intake/outflow unit 18/20 is connected to and in fluid communication with at least one foam fractionation device 14 through an outflow conduit 44. In some embodiments, the intake/outflow unit 18/20 is also connected to and in fluid communication with at least one foam fractionation device 14 through an intake conduit. An exemplary intake/outflow unit is shown in FIGS. 2 and 3. However, it will be understood that configurations of water intake and/or outflow, including intake and outflow units, other than that shown in the figures may be used.

Figure 5:
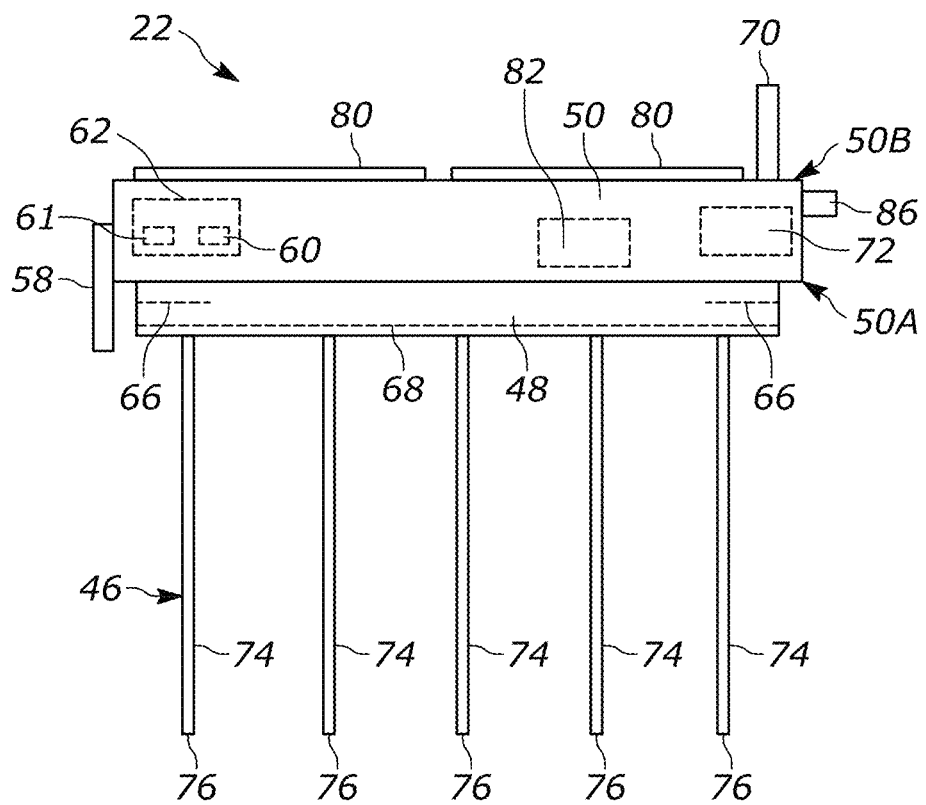
FIG. 5 shows a stylized side view of a first exemplary embodiment of a floating foam fractionation device, in accordance with the present disclosure.
Figure 6:
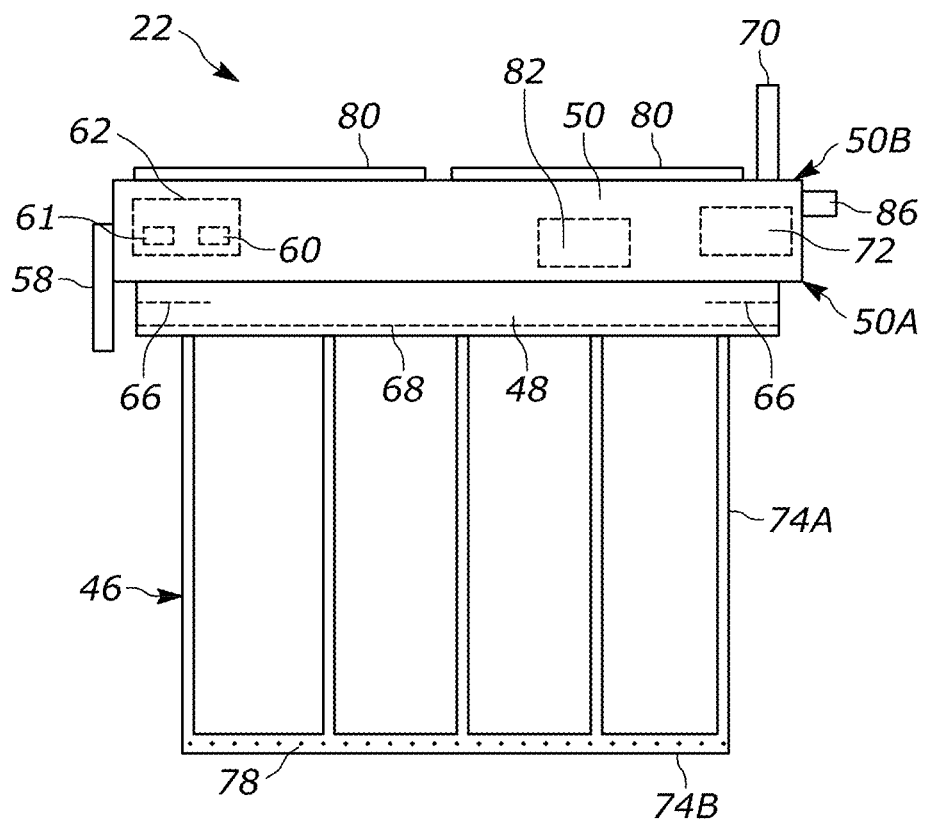
FIG. 6 shows a stylized side view of a second exemplary embodiment of a floating foam fractionation device, in accordance with the present disclosure.
Figure 8:
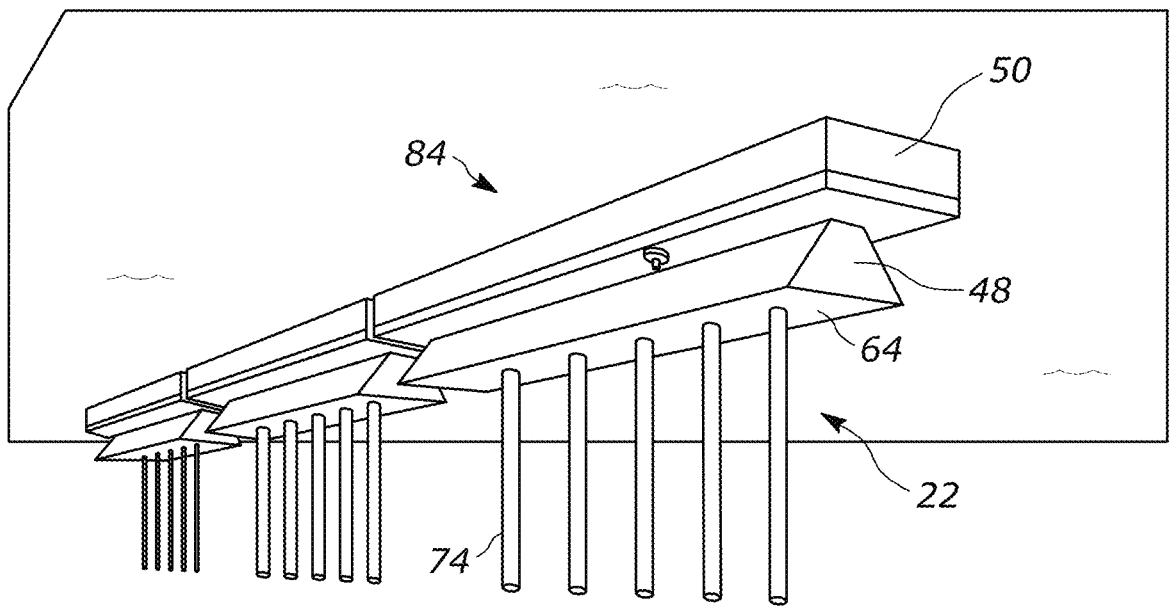
FIG. 8 shows a bottom perspective view of the plurality of floating foam fractionation devices, in accordance with the present disclosure.

As is described in greater detail below, in some embodiments the foam fractionation system 10 includes one or more floating foam fractionation devices 22 or other intake units that also produces and retains its own foam/skimmate, which may expand the effective treatment area of the foam fractionation system. In one non-limiting example, each floating foam fractionation device 22 is a floating structure that includes a trough to collect overflowing "dirty" microbubbles (foam) floating up in a curtain from a variable depth air conduit assembly 46 (for example, as shown in FIGS. 5, 6, and 8) Each floating foam fractionation device 22 may include a submerged hood 48 that converges into an open center of the floating foam fractionation device 22. As the foam accumulates and overflows through the open center, it is collected into and retained by a trough. When the trough becomes full or reaches a threshold fill level, the foam may be automatically (such as by vacuum), semi-automatically, or manually removed (for example, moved into a waste containment unit) for disposal or further processing.

The floating foam fractionation devices 22 may be connected to each other in any of a variety of configurations, such as a chain, a circle, or mesh layered pattern. For example, a plurality of floating foam fractionation devices may be connected to each other in a blockade ring to surround sewage or oil spills, or lined up in chains to extend along canals. Further, one or more of the floating foam fractionation devices 22 may be in direct electrical, mechanical, and/or fluid communication with each other, the base vessel 12, one or more foam fractionation devices 14, and/or other components of the foam fractionation system 10. For example, the floating foam fractionation device(s) 22 may include pump(s) that are powered by a power source on the base vessel, and/or a plurality of floating foam fractionation devices 22 may be connected to each other through air and waste conduits, quick-disconnect hardware, and the like. However, it will be understood that configurations other than those shown and described herein may be used.

In general operation, the foam fractionation system 10 disclosed herein draws water having waste molecules into one or more foam fractionation devices 14, which remove the waste molecules and eject or outflow cleaned water into the surrounding environment. Optionally, water having waste molecules is also drawn into one or more floating foam fractionation devices 22 for additional cleaning. In one embodiment, water is drawn into the intake nozzle(s) 42 of the intake unit(s) 18 (and/or, optionally, intake/outflow unit(s) 18/20), from where it passes through the intake conduit(s) 36 and into at least one foam fractionation device 14. Foam and other waste materials are expelled or discharged from the foam fractionation device(s) 14 through waste conduit(s) 28 and is collected in waste containment unit(s) 16 for later processing and removal. Cleaned water is simultaneously expelled or discharged from the foam fractionation device(s) 14 through outflow conduit(s) 44 and back into the surrounding environment. In one embodiment, an outflow conduit 44 is connected to an intake/outflow unit 18/20, which is propelled (for example, along the bottom of the ocean, canal, or other body of water) by the force of the expelled clean water. The foam fractionation system 10 is scalable to increase the effective area of water treated. For example, one or two foam fractionation devices 14 may be used to treat a smaller area of water, whereas the foam fractionation system 10 may be adapted to treat a larger area of water by including three or more foam fractionation devices 14. In some embodiments, more than one foam fractionation system 10 may be used and optionally placed into fluid, mechanical, and/or electrical communication with each other. Further, the foam fractionation system 10 may be adapted to treat a larger area of water, or uniquely shaped areas of water, by including one or more floating foam fractionation devices 22.

Figure 7:
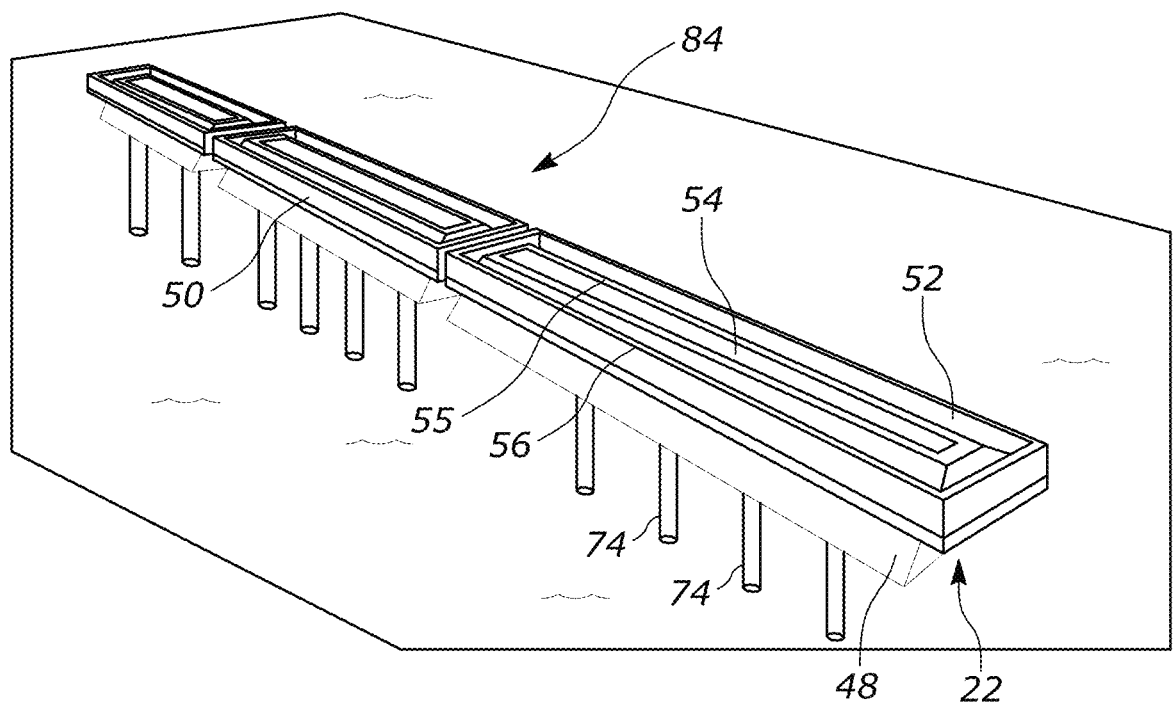
FIG. 7 shows a top perspective view of a plurality of floating foam fractionation devices, in accordance with the present disclosure.

Referring now to FIGS. 5-8, exemplary floating foam fractionation devices 22 are shown. FIG. 5 shows a stylized side view of a first exemplary embodiment of a floating foam fractionation device; FIG. 6 shows a stylized side view of a second exemplary embodiment of a floating foam fractionation device; FIG. 7 shows a top perspective view of a plurality of floating foam fractionation devices; and FIG. 8 shows a bottom perspective view of the plurality of floating foam fractionation devices.

Referring to FIGS. 5 and 6, each floating foam fractionation device 22 is configured for use in any body of water, including open waterways, such as canals, rivers, inlets, open water, lakes, ponds, and the like. In one embodiment, the floating foam fractionation device 22 generally includes a body 50, a hood 48, and at least one bubble generation system. In operation, the bubble generation system expels or injects a large number of small air bubbles into the water in an area referred to herein as the "surrounding environment." In some methods of use, the air bubbles float toward the surface of the water and into the hood 48. Along the way, hydrophobic and/or amphipathic molecules are attracted to the air/water interface and accumulate on the surfaces of the bubbles. At the surface of the water, the bubbles form a denser foam. Non-polar molecules are attracted to the surface of the bubbles and float upward through the water, accumulating as a foam within the hood 48 and spilling over into the body 50. The injection of bubbles into the water increases oxygenation in hypoxic conditions.

Continuing to refer to FIGS. 5 and 6, in one embodiment the body 50 is configured to float on a surface of the water, such that at least a portion extends above the waterline (for example, as shown in FIGS. 7 and 8). In some embodiments, the body 50 has a generally rectangular shape, but it will be understood that any suitable shape may be used. The body 50 is composed of a lightweight yet durable material that can withstand or resist degradation by direct sunlight, salt water, oil and/or other floating contaminants, and other environmental stresses. In one non-limiting example, the body 50 is composed of plastic (such as polyvinyl chloride (PVC), polyethylene (PE), and/or polypropylene), silicone, rubber, closed-cell foam, and/or or other rigid or semi-rigid materials.

Continuing to refer to FIGS. 5 and 6, the body 50 includes or defines at least one foam collection basin 52 configured to collect and retain a volume of foam and at least one inlet aperture 54. Accumulating foam overflows through the inlet aperture 54 and into the collection basin 52. The dimensions of the foam collection basin(s) 52 may be chosen based on the size and configuration of the body 50, how often the foam will be removed from the foam collection basin 52, volume of bubbles injected into the immediate environment by the bubble generation system, the expected volume of foam generated per minute, and/or other considerations.

Continuing to refer to FIGS. 5 and 6, and with reference to FIG. 7, in some embodiments the foam collection basin 52 functions as a trough or gutter for collecting foam. In one embodiment (for example, as shown in FIG. 7), the upper side of the body 50 includes or defines an elongate central inlet aperture 54 that is bordered by a lip or raised border 55 that extends upward above at least a portion of the floor of the foam collection basin 52. The inlet aperture 54 extends between the lower side 50A and upper side 50B of the body 50. In in one embodiment, the upper side 50B of the body 50 also includes or defines a wall 56 (for example, along the outer edges of the upper side 50B of the body). Thus, the foam collection basin 52 is at least partially defined by the raised border of the inlet aperture 54 and the wall 56 of the body 50. As foam builds up within the inlet aperture 54, it eventually spills over the raised border of the inlet aperture 54 and into the foam collection basin 52, where it is retained by the wall 56 of the body 50. In another embodiment, at least a portion of the floor of the foam collection basin is sloped from the inlet aperture toward the wall 56, such that the inlet aperture 54 is higher than the portion of the floor that is adjacent to the wall 56 of the body 50. In either embodiment, a volume of foam (skimmate) is prevented from flowing either back into the inlet aperture 54 or into the surrounding water. In one embodiment, waste foam or liquid is dispensed of automatically and/or manually before accumulating within the collection basin 52 to the level of the inlet aperture 54. One non-limiting example of the foam collection basin 52 is shown in FIG. 7. However, it will be understood that other configurations may be used.

Continuing to refer to FIGS. 5 and 6, in some embodiments the floating foam fractionation device 22 includes at least one outflow conduit 58 coupled to, integrated with, or defined by the body 50 for the removal of excess or overflowed water from the foam collection basin 52. In one embodiment, the outflow conduit(s) 58 include one or more outflow deflectors, filters, and/or other components for the controlled, safe, and effective removal of water from the floating foam fractionation device 22 and return to the surrounding environment. In some embodiments, the floating foam fractionation device 22 further includes one or more sensors 60 to detect a maximum foam fill level and/or determine a volume of foam or fill level within the foam collection basin 52. In some embodiments, the sensor(s) 60 are in communication (wired, wireless, thermal, optical, infrared, chemical, mechanical etc.) with a network 27 and/or remote computer for automatically or semi-automatically removing foam from the foam collection basis by suction, drainage, pumping (such as by bilge pump on or within the body, or on or within a separate bilge vessel), or other means (for example, as shown in FIG. 13). Additionally or alternatively, the sensor(s) 60 are in direct communication with one or more suction, drainage, or pumping devices (for example, a float sensor for actuating a bilge pump and/or valve(s)) for removal of the foam into a waste containment unit 16. Further, in some embodiments the floating foam fractionation device 22 includes one or more transceivers and/or communication modules 61 (Bluetooth®, Zigbee®, near field communication, infrared, etc.)

for the transfer and/or receipt of data, instructions, and/or signals from remote devices, such as computers, user interface devices, servers, networks, user radios or cellular devices, and/or the like. For simplicity of illustration, sensor(s), communication modules, and/or other components for the collection, organization, processing, receiving, and/or transmitting data are collectively referred to as "data processing components" and indicated in FIGS. 5 and 6 as reference number 62. In one embodiment, the data processing components 62 may be the same as or similar to, at least in function, the operational components 26 of the system 10. It will be understood that alternative or additional means for monitoring and managing the level or volume of foam within the foam collection basin 52, as well as for the collection and organization of data (including foam composition, detected waste particles, operating hours, fault conditions, volume of foam collected, air flow volume and rate) may be used.

Continuing to refer to FIGS. 5 and 6, the hood 48 is coupled to or integrated with, and extends downward from, the lower side 50A of the body 50. Thus, when the floating foam fractionation device 22 is in use, the hood 48 is submerged or at least partially submerged in the water. The hood 48 is sized and configured such that the bubbles rising from a depth within the water will enter into and be collected within an inner chamber 64 of the hood 48. In one embodiment, the hood 48 is tapered, with the narrower (upper) end being coupled to or integrated with the lower side 50A of the body 50. The narrower end defines an outlet that is aligned with and in fluid communication with the inlet aperture 54 of the body 50 and the wider (lower) end of the hood 48 is positioned to collect the bubbles. The shape and degree of taper of the hood 48 collects bubbles evenly and reduces turbulence. Further, in some embodiments the floating foam fractionation device 22 includes one or more bubble plates 66 within the hood 48 to reduce turbulence and increase bubble dwell time within the water. Still further, in some embodiments the floating foam fractionation device 22 includes one or more pre-treatment devices 68, such as filters, deflectors, scourers, and/or the like, located within and/or below the hood to prefilter and/or pre-treat water and bubbles before the bubbles enter the hood 48. For example, this may prevent the intake of large particles, aquatic organisms, and other undesired items. Further, it will be understood that sizes, shapes, orientations, and features of the hood 48 other than those shown may be used.

Continuing to refer to FIGS. 5 and 6, the bubble generation system creates a large volume of small bubbles (microbubbles) within the water below the floating foam fractionation device. In one embodiment, the bubble generation system generally includes an air intake element 70, an air pump 72 (or source of compressed air), and air conduit assembly 46. In some embodiments, the air intake element 70, the air pump 72, and the air conduit assembly 46 are attached to or integrated with the floating foam fractionation device 22. In other embodiments, the air pump 72 is located remotely from, but in fluid communication with, the floating foam fractionation device 22. In one embodiment, the air pump 72 is within or attached to the body 50 and is in fluid communication with the air intake element 70 and the air conduit assembly 46. The air intake element 70 may be a tube extending from the body 50, an aperture in the body 50, and/or may have another suitable configuration. In operation, the air pump 72 draws in air from the surrounding environment through the air intake element 70 and forces it through one or more air conduits 74 of the air conduit assembly 46, from where it is ejected into the immediate environment as small air bubbles. The force of air injections and/or the bubble generation system is configured such that the bubbles extend across an area that is at most as wide as the opening of the wider end of the hood 48. This helps ensure that all or most of the bubbles generated by the bubble generation system (and attached/associated waste) are captured within the hood 48 and foam does not accumulate on the surface of the water surrounding or outside of the floating foam fractionation device 22.

Continuing to refer to FIGS. 5 and 6, the air conduit assembly 46 includes at least one air conduit 74. For example, in one embodiment the air conduit assembly 46 includes a plurality of air conduits 74 that are hollow and extend vertically or substantially vertically downward from the bottom side of the body, passing through the hood. At least one of the air conduits 74 is directly or indirectly coupled to, and in fluid communication with, the air pump 72 and/or air intake element 70. In one embodiment, each air conduit 74 includes an outlet aperture or opening 76 at the distal end, to allow air bubbles to escape from within the air conduit 74. Optionally, each air conduit 74 may include one or more apertures or openings along the length of the air conduit 74 instead of or in addition to the aperture 76 at the distal end. In one embodiment, each of the plurality of air conduits is a first air conduit 74A, and does not include an aperture or opening at the distal end; instead, the air conduit assembly further includes one or more second air conduits 74B that are hollow and extend horizontally or substantially horizontally, connecting and in fluid communication with the plurality of first air conduits 74A (for example, as shown in FIG. 6). In some embodiments, the second air conduit(s) 74B extend between fewer than all of the plurality of first air conduits 74A. The second air conduit(s) 74B include a plurality of outlet apertures 78 sized and configured to product a large amount of microbubbles. Thus, in one embodiment all air conduits 74 are in fluid communication with each other and air from the air pump 72 is forced throughout the air conduit assembly 46 and out the plurality of outlet apertures 76 and/or 78. However, it will be understood that configurations of the air conduit assembly 46 other than those shown and described herein may be used.

Continuing to refer to FIGS. 5 and 6, in some embodiments one or more components of the floating foam fractionation device 22 may require electrical power, such as the air pump 72 and/or data processing components 62 (for example, sensor(s) 60, communication modules 61, remote operation components, pumps, and/or the like). To provide power to these components, in some embodiments the foam fractionation device includes one or more solar panels 80 mounted or coupled to the body 50 at a location above the water line. Additionally or alternatively, the floating foam fractionation device 22 may include one or more batteries or other power sources 82.

Referring now to FIGS. 7 and 8, a plurality of floating foam fractionation devices 22 are shown. As shown, each floating foam fractionation device 22 may be configured to be coupled to one or more adjacent floating foam fractionation devices 22 in series, in parallel, in circles, and/or in other configurations or patterns to form a linked floating foam fractionation assembly 84. When so connected, the plurality of floating foam fractionation devices 22 may create a wall, curtain, zone, or area, of bubbles to not only trap non-polar molecules from within the body of water, but also to contain surface film(s), particulates and/or other contaminants within, or direct the surface film(s), particulates, and/or contaminants into, a desired area of the body of water. In one non-limiting example, each floating foam fractionation device 22 includes a coupling mechanism 86 (shown in FIG. 5) at or on at least one side surface of the body 50. For example, as shown in FIGS. 7 and 8, the body 50 has an elongate shape and a coupling mechanism 86 at each of opposite ends. However, it will be understood that other configurations are contemplated, such as a body 50 having a round, polygonal, or irregular shape with one or more coupling mechanisms 86 located adjacent to each other, around the circumference of the body 50, or at irregular intervals. In some embodiments, the coupling mechanism 86 includes one or more devices or elements that allow the bodies 50 of adjacent floating foam fractionation devices 22 to be mateably, pivotally, and/or rotatably connected, such as clamp(s), ball-and-socket components, pins, carabiners, hooks, clasps, or other suitable means for connection. Such a connection may be permanent, semi-permanent, or quick/emergency release. Additionally, in some embodiments, air, waste removal, electrical, and/or other conduits, such as hoses, of each floating foam fractionation device 22 are connectable to those of adjacent foam fractionation devices 22 such that the entire linked floating foam fractionation assembly 84 is connected (that is, each floating foam fractionation device 22 is in fluid, mechanical, and/or electrical communication with any and/or all other floating foam fractionation device in the linked floating foam fractionation assembly). Although the plurality of floating foam fractionation devices 22 may be connected to and/or used in combination with a base vessel 12 as shown in FIGS. 1-4, one or more floating foam fractionation devices 22 may be used individually or as standalone groups capable of removing waste from a body of water independently of the base vessel 12 and/or foam fractionation devices 14 supported by the base vessel 12.

Continuing to refer to FIGS. 7 and 8, in one non-limiting example of use, a user first determines the size and shape of an area of water to be treated. The user then calculates a volume of the area of water to be treated and a level of contamination of the area of water to be treated. Then, the user determines how many floating foam fractionation devices 22 should be used to remove a minimum desired amount of waste from the area of water and determines a suitable configuration in which to connect and arrange the floating foam fractionation device(s) 22 into a linked floating foam fractionation assembly 84. Finally, the user deploys the linked floating foam fractionation assembly 84 in the area of water to be treated.

Figure 9:
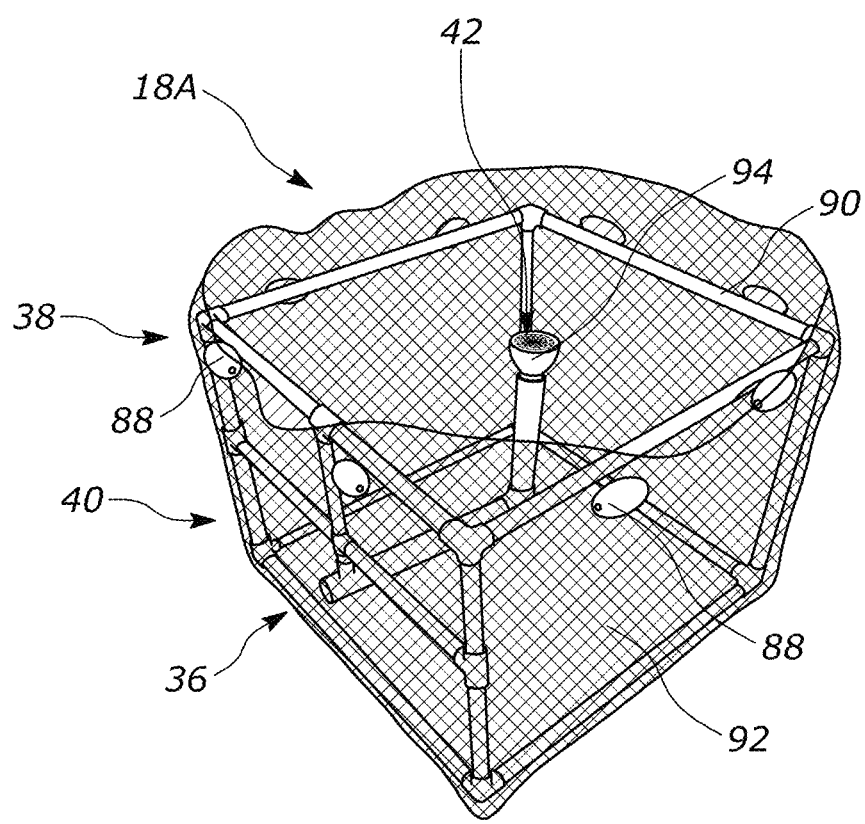
FIG. 9 shows a perspective view of an exemplary surface film intake unit, in accordance with the present disclosure.

Referring now to FIG. 9, an exemplary surface film intake unit 18A is shown. As discussed above regarding FIGS. 1-4, in one embodiment, the surface film intake unit 18A is a floating device that is connected to and in fluid communication with at least one foam fractionation device 14 by an intake conduit 36 (shown in FIGS. 2 and 3). For example, the surface film intake unit 18A may include a flotation portion 38 and a submersible portion 40 attached to the flotation portion 38. In some embodiments, the flotation portion 38 includes one or more flotation elements 88 coupled to or integrated with a frame 90. In some embodiments, the submersible portion 40 includes a hood, basket, reservoir, mesh surrounding a frame, or other structure through which water may freely flow but fish, large debris, submerged/submersed aquatic plants, coral, and other items are excluded. For example, the submersible portion 40 may include mesh 92, be constructed of woven materials, and/or have a plurality of apertures, slats, holes, or other apertures sized to exclude larger items (for example, items larger than approximately 0.25 inch in diameter). In some embodiments, the submersible portion 40 includes solid walls that are not permeable to water and that define a chamber therein. In such a configuration, the flotation portion 38 may also include a mesh, apertured and/or notched parapet, or other structure through which surface water may be drawn into the chamber of the submersible portion 40.

Continuing to refer to FIG. 9, in some embodiments, the surface film intake unit 18A includes at least one intake nozzle 42 through which water and skimmed waste flows into the intake conduit 36. The intake nozzle 42 may be positioned at least partially within the submersible portion 40 and/or may include a filter, mesh, basket, apertured shield, or other protective component 94. Further, in some embodiments, at least a portion of the intake nozzle 42 is positioned close enough to the surface of the water that it draws in a small flow of air to create a vortex that extends downward into the intake nozzle when the surface film intake unit 18A is in use. In some embodiments wherein the submersible portion 40 includes solid walls, the intake nozzle 42 is located below the level at which the mesh or parapet begins. In operation, the location of the intake nozzle 42 below the surface of the water helps draw surface films, such as oil or fuel slicks, as a vortex into the intake nozzle 42. In some embodiments, the intake nozzle 42 is manually, automatically, or semi-automatically adjustable or actuatable (for example, selectively opened and closed, or selectively raised and lowered in water depth) to control the volume and/or speed of water and/or air entering the intake conduit 36. However, it will be understood that other configurations are contemplated, such as those in which the intake unit 18 is not a surface film intake unit 18A, and instead is weighted or configured to rest at the bottom of the body of water. In some embodiments, the intake nozzle 42 and/or other portion of the intake unit 18 (including, in some embodiments, the surface film intake unit 18A) includes a filter, one or more sensors, one or more valves, and/or other components to effectuate adjustment of the intake nozzle 42.

Figure 10:
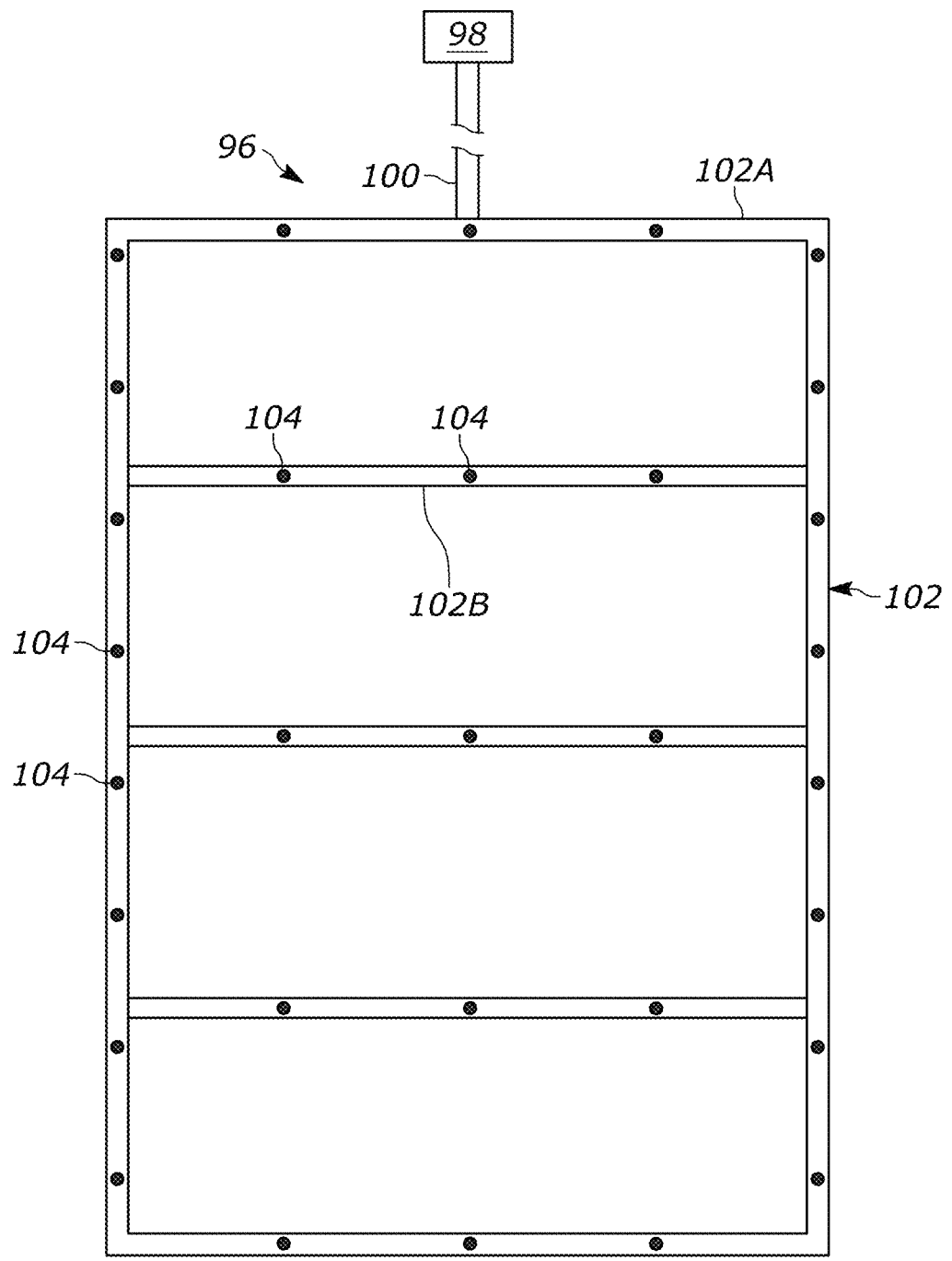
FIG. 10 shows an exemplary bubble generation device, in accordance with the present disclosure.

Referring now to FIG. 10, an exemplary bubble generation device 96 is shown. In one embodiment, the bubble generation system includes a bubble generation device 96 that is an air conduit assembly that is submerged or submersible within the body of water and is configured to be in fluid communication with an air pump 98 (or source of compressed air) through an air intake conduit 100. In one embodiment, the bubble generation device 96 is used to create a wall, curtain, zone, or area, of bubbles not only for entrapment of non-polar molecules from within the body of water by one or more intake devices 18 (and/or 18/20), but also to contain surface film(s), particulates, and/or other contaminants within, or direct the surface film(s), particulates, and/or contaminants into, a desired area of the body of water. In one embodiment, the bubble generation device 96 includes a grid of hollow air conduits 102. For example, in one embodiment the bubble generation device 96 includes an outer air conduit frame 102A and at least one transverse air conduit 102B extending between sides of the air conduit frame 102A. The air conduit frame 102A and/or the at least one transverse air conduit 102B includes outflow apertures 104 to release air bubbles into the water from within the bubble generation device 96. The size, shape, and bubble density of the area of air bubbles generated or released from the bubble generation device 96 (that is, the bubble generation capacity) may depend on factors such as the size, shape, and/or configuration of the bubble generation device 96, size and number of transverse air conduits 102, size and number of outflow apertures 104, the force of air injected into the bubble generation device, and the like. Thus, it will be understood that configurations of the bubble generation device 96 other than that shown in FIG. 10 may be used.

Figure 11:
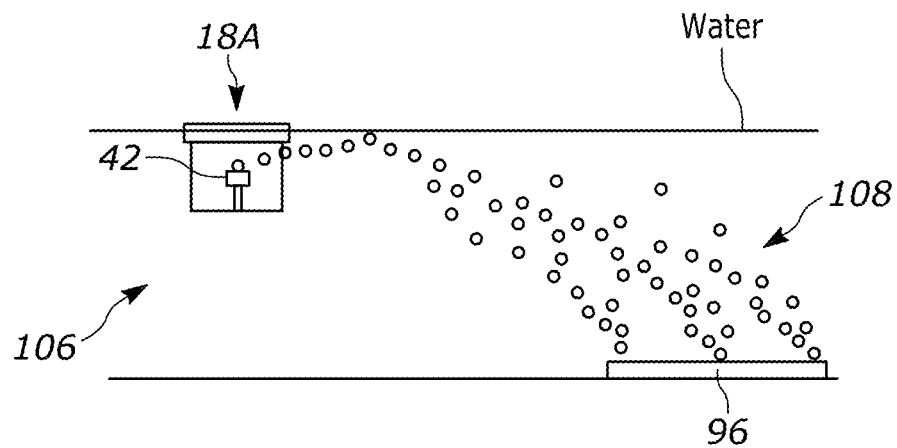
FIG. 11 shows an exemplary bubble generation and intake system in a first use configuration, in accordance with the present disclosure.
Figure 12:
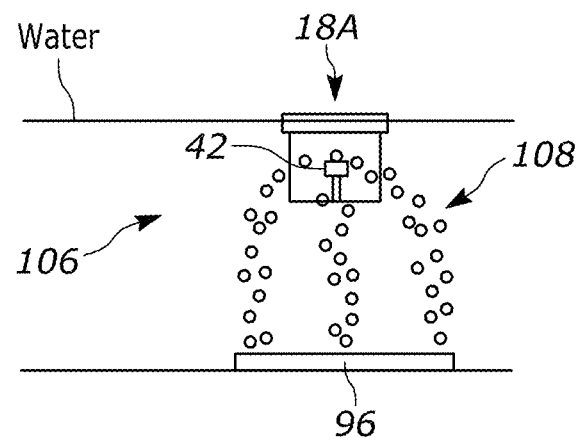
FIG. 12 shows the exemplary bubble generation and intake system of FIG. 11 in a second use configuration, in accordance with the present disclosure.

Referring now to FIGS. 11 and 12, an exemplary bubble generation and intake system 106 is shown in use. A first use configuration is shown in FIG. 11 and a second use configuration is shown in FIG. 12. In some embodiments, the foam fractionation system 10 includes at least one bubble generation device 96 that is configured to work in concert with one or more intake units 18, such as a surface film intake unit 18A (as shown in FIGS. 11 and 12) and/or one or more other system components configured to intake skimmate. The at least one bubble generation device 96 is configured to generate bubbles and the at least one intake unit 18 is configured to draw in air bubbles and/or foam to which non-polar waste molecules are bound. Thus, in some embodiments, the at least one bubble generation device 96 and at least one intake unit 18 are components of the bubble generation and intake system 106, and the bubble generation and intake system 106 is a component of the foam fractionation system 10. The bubble generation and intake system 106 may be coupled to and/or used with a base vessel 12 and/or other components of the foam fractionation unit 14 shown in FIGS. 1-4. In one embodiment, a surface film intake unit 18A is connected to at least one foam fractionation device 14 supported on the base vessel 12 by an intake conduit 36. Further, in some embodiments, the bubble generation and intake system 106 additionally or alternatively includes intake units 18 other than the surface film intake unit 18A, such as an intake/outflow unit 18/20 and/or other floating or partially submerged intake units.

Referring to FIG. 11, the bubble generation and intake system 106 may be used in flowing water (such as a stream, river, flowing irrigation canal, or the like) or in a body of water that experiences significant tidal flow. When used in such a body of water, in one embodiment a bubble generation device 96 may be submerged and located at a position that is upstream of a surface film intake unit 18A (or other intake unit 18). In this configuration, bubbles 108 produced by the bubble generation device 96 will flow downstream toward the surface film intake unit 18A, binding waste along the way. This maximizes the amount of foam/bubbles the surface film intake unit 18A is able to draw in and transport to the foam fractionation device(s) 14.

Referring to FIG. 12, the bubble generation and intake system 106 may be used in stagnant or still water (such as a pond or lake) or in a body of water that experiences no or insignificant water movement. When used in such a body of water, in one embodiment a bubble generation device 96 may be submerged and located at a position that is directly below or below and proximate a surface film intake unit 18A (or other intake unit 18). In this configuration, bubbles 108 produced by the bubble generation device 96 will flow direction, or substantially directly, upward toward the surface film intake unit 18A, binding waste along the way. This maximizes the amount of foam/bubbles the surface film intake unit 18A is able to draw in and transport to the foam fractionation device(s) 14.

EMBODIMENTS

In one embodiment, a system for removing waste materials from a body of water comprises at least one foam fractionation device; and a water intake unit in fluid communication with the at least one foam fractionation device, the water intake unit being configured to be located a distance from the foam fractionation device when the system is in use.

In one aspect of the embodiment, the system further comprises a base vessel, the at least one foam fractionation device being located on the base vessel. In one aspect of the embodiment, the base vessel is a floating barge.

In one aspect of the embodiment, the water intake unit is configured to intake water but to exclude items larger than approximately 0.5 inch in diameter.

In one aspect of the embodiment, the intake unit includes an adjustable intake nozzle.

In one aspect of the embodiment, the water intake unit is configured to float.

In one aspect of the embodiment, the water intake unit is in fluid communication with the at least one foam fractionation device by an intake conduit.

In one aspect of the embodiment, the water intake unit includes a filter.

In one aspect of the embodiment, the at least one foam fractionation device is two or more foam fractionation devices.

In one aspect of the embodiment, the system further comprises at least one waste containment unit.

In one aspect of the embodiment, the at least one waste containment unit is in fluid communication with the at least one foam fractionation device by a waste conduit.

In one aspect of the embodiment, the at least one waste containment unit is configured to float.

In one aspect of the embodiment, the system further comprises at least one surface skimmer, the at least one surface skimmer being positionable a distance from the at least one foam fractionation device. In one aspect of the embodiment, the system further comprises: a base vessel; and a power supply on the base vessel, the power supply providing power to the at least one foam fractionation device.

In one embodiment, a method for removing waste materials from a body of water comprises: positioning a base vessel within the body of water, the base vessel supporting a plurality of foam fractionation devices; and intaking water from the body of water into the plurality of foam fractionation devices through a water intake unit, the water intake unit floating on a surface of the body of water.

In one aspect of the embodiment, the method further comprises discharging waste materials from the plurality of foam fractionation devices into a waste containment unit. In one aspect of the embodiment, the waste containment unit floats on a surface of the body of water. In one aspect of the embodiment, the method further comprises removing waste materials from the waste containment unit.

In one aspect of the embodiment, the method further comprises: positioning a plurality of base vessels within the body of water, each of the plurality of base vessels supporting a plurality of foam fractionation devices; and intaking water from the body of water into the plurality of foam fractionation devices of each of the plurality of foam fractionation devices through the water intake unit.

In one embodiment, a system for removing waste materials from a body of water comprises at least one floating foam fractionation device, each of the at least one floating foam fractionation device including: a body, the body having an upper portion and a lower portion; a hood extending downward from the lower portion of the body; and a bubble generation system.

In one aspect of the embodiment, the bubble generation system has: an air intake element; an air conduit assembly extending downward from the lower portion of the body and through the hood; and an air pump in fluid communication with the air intake element and the air conduit assembly.

In one aspect of the embodiment, the air conduit assembly includes a plurality of first air conduits, each of the plurality of first air conduits being at least substantially vertical.

In one aspect of the embodiment, each of the plurality of first air conduits includes a distal end defining an outlet aperture.

In one aspect of the embodiment, the air conduit assembly further includes at least one second air conduit, the at least one second air conduit extending between at least two of the plurality of first air conduits. In one aspect of the embodiment, the at least one second air conduit includes a plurality of outlet apertures.

In one aspect of the embodiment, the body defines: an inlet aperture, the inlet aperture extending through the body from the upper portion to the lower portion; and a foam collection basin at least partially surrounding the inlet aperture. In one aspect of the embodiment, the inlet aperture is in fluid communication with the hood.

In one aspect of the embodiment, the at least one floating foam fractionation device includes a plurality of floating foam fractionation devices. In one aspect of the embodiment, the body of each of the plurality of foam fractionation devices includes a coupling mechanism.

In one aspect of the embodiment, the coupling mechanism of one of the plurality of foam fractionation devices is engageable with the coupling mechanism of another of the plurality of foam fractionation devices.

In one aspect of the embodiment, the plurality of floating foam fractionation devices are coupled together in series.

In one aspect of the embodiment, the plurality of floating foam fractionation devices are coupled together in a ring.

In one embodiment, a floating intake unit for use with a foam fractionation system comprises: a flotation portion; a submersible portion attached to the flotation portion, the submersible portion being configured to be submerged when the floating intake unit is in use; and an intake nozzle within the submersible portion.

In one aspect of the embodiment, the submersible portion includes a plurality of apertures sized such that items larger than approximately 0.5 inch in diameter are excluded from entering the submersible portion.

In one aspect of the embodiment, the intake nozzle is positioned within the submersible portion such that the intake nozzle is below a surface of water and is configured to draw a film of waste floating on the surface of the water into the intake nozzle when the floating intake unit is in use.

In one aspect of the embodiment, the system further comprises an intake conduit, the intake conduit being configured to be connected between the intake nozzle and a foam fractionation device.

In one embodiment, a method for removing waste materials from a body of water comprises: submerging a bubble generation device within a body of water; positioning a floating intake unit at a location remote from the bubble generation device, the floating intake unit including a flotation portion, a submersible portion, and an intake nozzle positioned within the submersible portion; generating a stream of bubbles from the bubble generation device; and operating the intake unit to draw the bubbles into the intake nozzle.

In one aspect of the embodiment, the method further comprises transferring the bubbles from the floating intake unit to a foam fractionation device.

In one aspect of the embodiment, the step of positioning the floating intake unit at a location remote from the bubble generation device includes positioning the floating intake unit at a location that is downstream of the bubble generation device.

It should be understood that various aspects disclosed herein may be combined in different combinations than the combinations specifically presented in the description and the accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, foam fractionation.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

As used herein, "and/or" means "and" or "or". For example, "A and/or B" means "A, B, or both A and B" and "A, B, C, and/or D" means "A, B, C, D, or a combination thereof" and said "A, B, C, D, or a combination thereof" means any subset of A, B, C, and D, for example, a single member subset (e.g., A or B or C or D), a two-member subset (e.g., A and B; A and C; etc.), or a three-member subset (e.g., A, B, and C; or A, B, and D; etc.), or all four members (e.g., A, B, C, and D).

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:
1. A method for removing waste materials from a body of water, the method comprising:
 positioning a floating base vessel within the body of water, the floating base vessel supporting at least one foam fractionation device on a surface of the floating base vessel such that an entirety of the at least one foam fractionation device is not in direct contact with the body of water;

intaking water from the body of water into the at least one foam fractionation device through an intake unit, the at least one foam fractionation device removing waste materials from the water, at least a portion of the intake unit floating on a surface of the body of water and the intake unit being located a distance from the at least one foam fractionation device;

opening a closure device of a floating waste containment unit;

discharging the waste materials from the at least one foam fractionation device into the floating waste containment unit, at least a portion of the floating waste containment unit floating on the surface of the body of water; and closing the closure device of the floating waste containment unit to retain the waste materials therein without leakage.

2. The method of claim 1, further comprising:

submerging a bubble generation device within the body of water;

positioning the intake unit at a location remote from the bubble generation device, the intake unit including an intake nozzle;

generating a stream of bubbles from the bubble generation device; and operating the intake unit to draw the bubbles into the intake nozzle.

3. A system for removing waste materials from a body of water, the system comprising at least one floating foam fractionation device, each of the at least one floating foam fractionation device including:

a body, the body having an upper portion and a lower portion, the body defining:

an inlet aperture, the inlet aperture extending through the body from the upper portion to the lower portion; and a foam collection basin, the foam collection basin having a floor and at least partially surrounding a portion of the inlet aperture in the upper portion of the body, the inlet aperture being bordered by a raised border that extends upward above the floor of the foam collection basin, such that the foam collection basin is configured to collect and retain foam and liquid that has overflowed from the inlet aperture into the foam collection basin;

a hood extending downward from the lower portion of the body, the hood defining a central chamber and being in fluid communication with the inlet aperture; and a bubble generation system.

4. The system of claim 3, wherein the bubble generation system has:

an air intake element;

an air conduit assembly extending downward from the lower portion of the body and through the hood; and an air pump in fluid communication with the air intake element and the air conduit assembly.

5. The system of claim 4, wherein the air conduit assembly includes a plurality of outlet apertures.

6. The system of claim 3, wherein the at least one floating foam fractionation device includes a plurality of floating foam fractionation devices, each of the plurality of floating foam fractionation devices including a coupling mechanism, the coupling mechanism of one of the plurality of floating foam fractionation devices being engageable with the coupling mechanism of another of the plurality of floating foam fractionation devices, the system further comprising a plurality of waste removal conduits, the plurality of floating foam fractionation devices being in fluid communication with each other by the plurality of waste removal conduits.

* * * * *